United States Patent [19]
Gonzalez

[11] 4,323,201
[45] Apr. 6, 1982

[54] AUTOMATIC FILM DE-SPLICER AND WINDER

[76] Inventor: Joe Gonzalez, Rte. 12, Box 1163, Tallahassee, Fla. 32304

[21] Appl. No.: 167,838

[22] Filed: Jul. 14, 1980

[51] Int. Cl.³ .......................................... B65H 19/20
[52] U.S. Cl. ................................................ 242/56 R
[58] Field of Search ................. 242/56 R, 56 A, 64, 242/67.1 R, 67.2, 67.3 R, 71.1

[56] References Cited

U.S. PATENT DOCUMENTS

| | | | |
|---|---|---|---|
| 1,065,681 | 6/1913 | Harbeck | 242/56 R |
| 2,663,514 | 12/1953 | McArthur | 242/56 R |
| 3,604,648 | 9/1971 | Schmidt | 242/56 R |
| 4,060,210 | 11/1977 | Norris | 242/71.1 |
| 4,218,032 | 8/1980 | Nagel | 242/71.1 |

*Primary Examiner*—Edward J. McCarthy
*Attorney, Agent, or Firm*—John Cyril Malloy

[57] ABSTRACT

An apparatus for winding a continuous previously spliced web of motion picture film onto a plurality of reels, in sequence, by de-splicing the film in their original splice areas, into separate original lengths and transferring the running film lengths onto separate reels so that in seratim, the film is wound upon a plurality of reels through a single device of the present invention.

18 Claims, 7 Drawing Figures

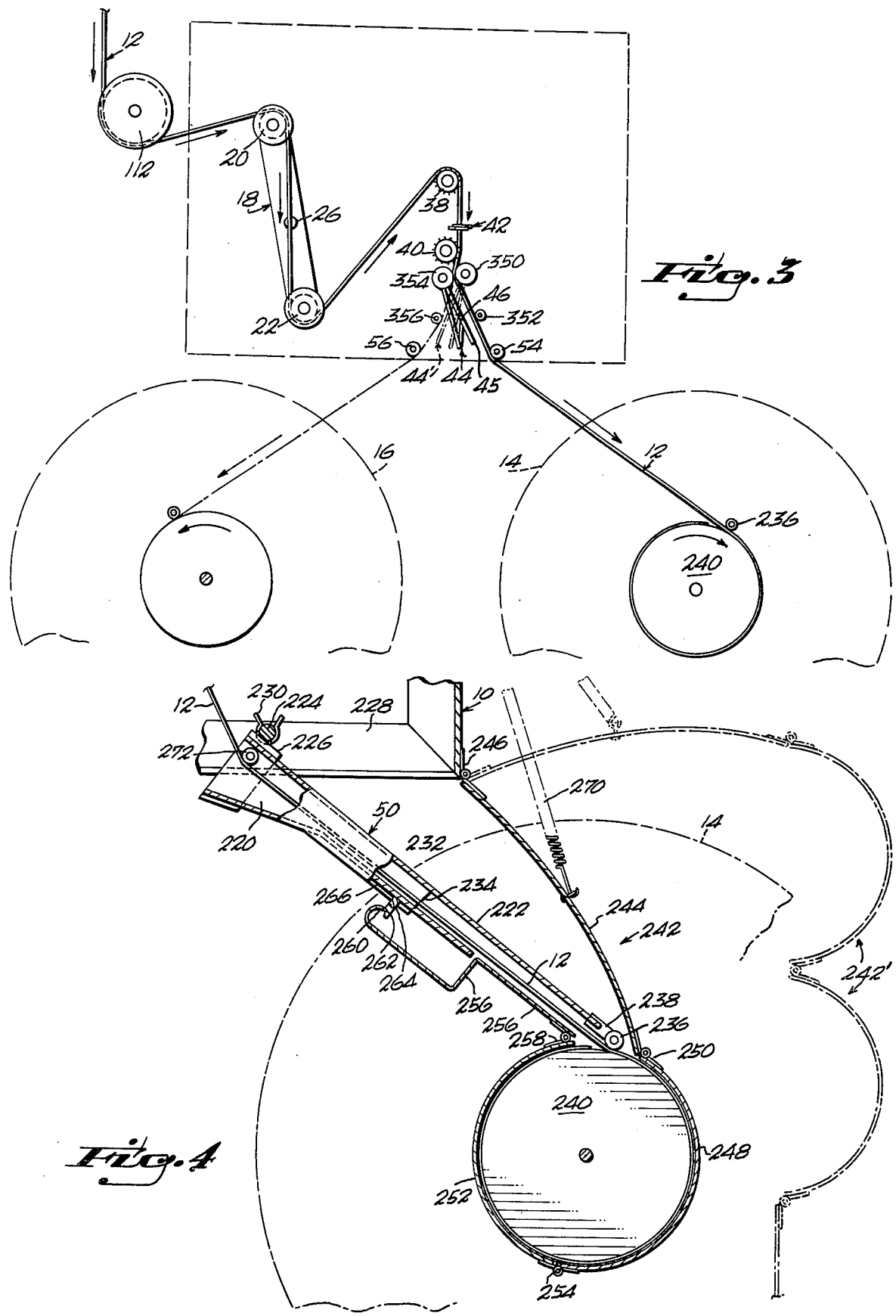

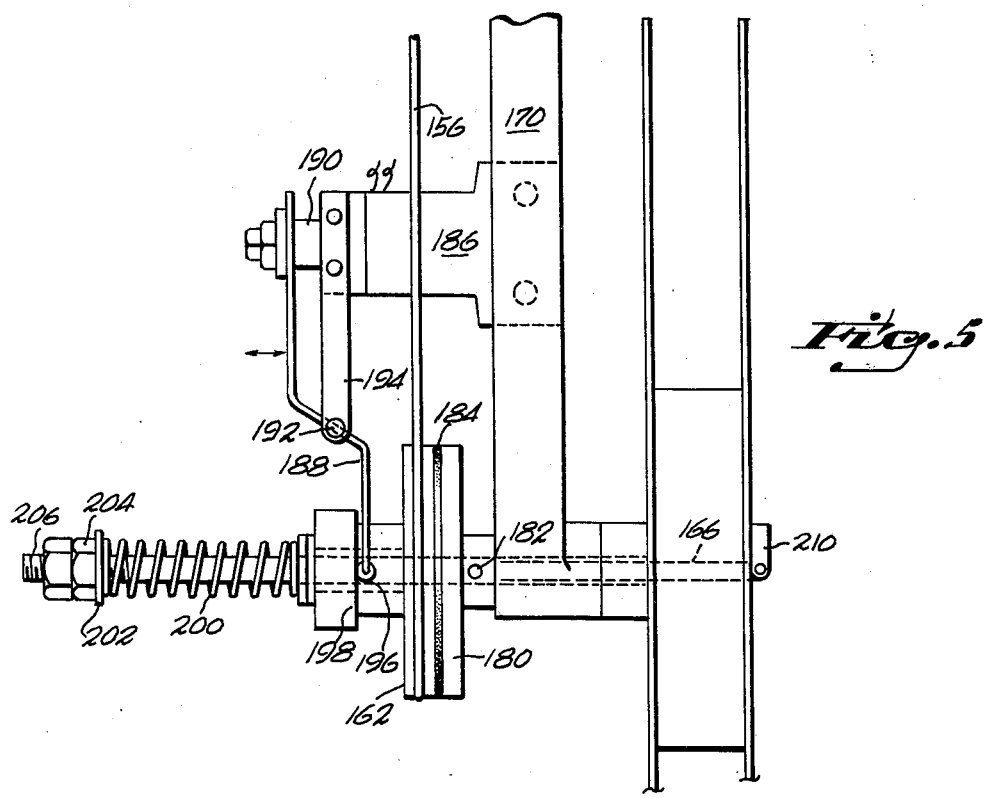
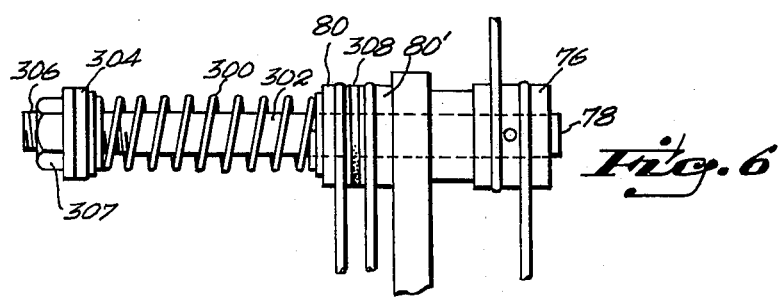

AUTOMATIC FILM DE-SPLICER AND WINDER

BACKGROUND OF THE PRESENT INVENTION

There are presently two systems of showing motion pictures at commercial theaters; the Platter System and the Reel to Reel System. The Reel to Reel system is archaic and is being phased into the Platter System almost entirely.

Both systems involve the use of shipping reels containing approximately 2,000 feet of film. The present invention is designed for use with the Platter System which requires that the film on the separate shipping reels be spliced together making a single film length up to approximately 30,000 feet long, for a continuous showing up to approximately 4½ hours without stopping.

There are two horizontal platters, and the film is automatically unwound from one platter, passes through the projector and rewound on the second horizontal platter. When the picture is last shown and must be prepared for shipping, the film must be de-spliced into its original shipping segments, which segments are individually rewound on separate 2,000 foot shipping reels.

This process is presently being done manually. The present invention is the first device to accomplish the de-splicing and rewinding automatically while the last presentation is being shown, thus saving much time, labor and effort, plus the labor cost of the substantial number of hours to accomplish the manual de-splicing and rewinding operation.

Therefore, one of the principal objects of the present invention is to provide a device to receive the leading end of a substantial length of spliced film, which can be up to 30,000 feet or more, and which sequentially de-splices the film in the areas of the original splices, and winds the de-spliced segments onto separate shipping reels. This operation is accomplished during the last presentation, before the film is, for example, to be shipped for presentation in another theater.

DESCRIPTION OF THE DRAWINGS

FIG. 3 is a schematic view illustrating the operating mechanism to sequentially direct film webs along two paths for sequential winding on two shipping reels;

FIG. 4 is a fragmentary view, partially in cross section, illustrating the automatic release mechanism for automatically starting the film winding operation on each of two reels, one being illustrated.

FIG. 5 is a fragmentary elevational view illustrating the automatic clutch mechanism for the shipping reels;

FIG. 6 is a fragmentary elevational view illustrating the adjustable clutch tensioning means for the main drive pulley;

DESCRIPTION OF THE PREFERRED EMBODIMENT

Figure 1:
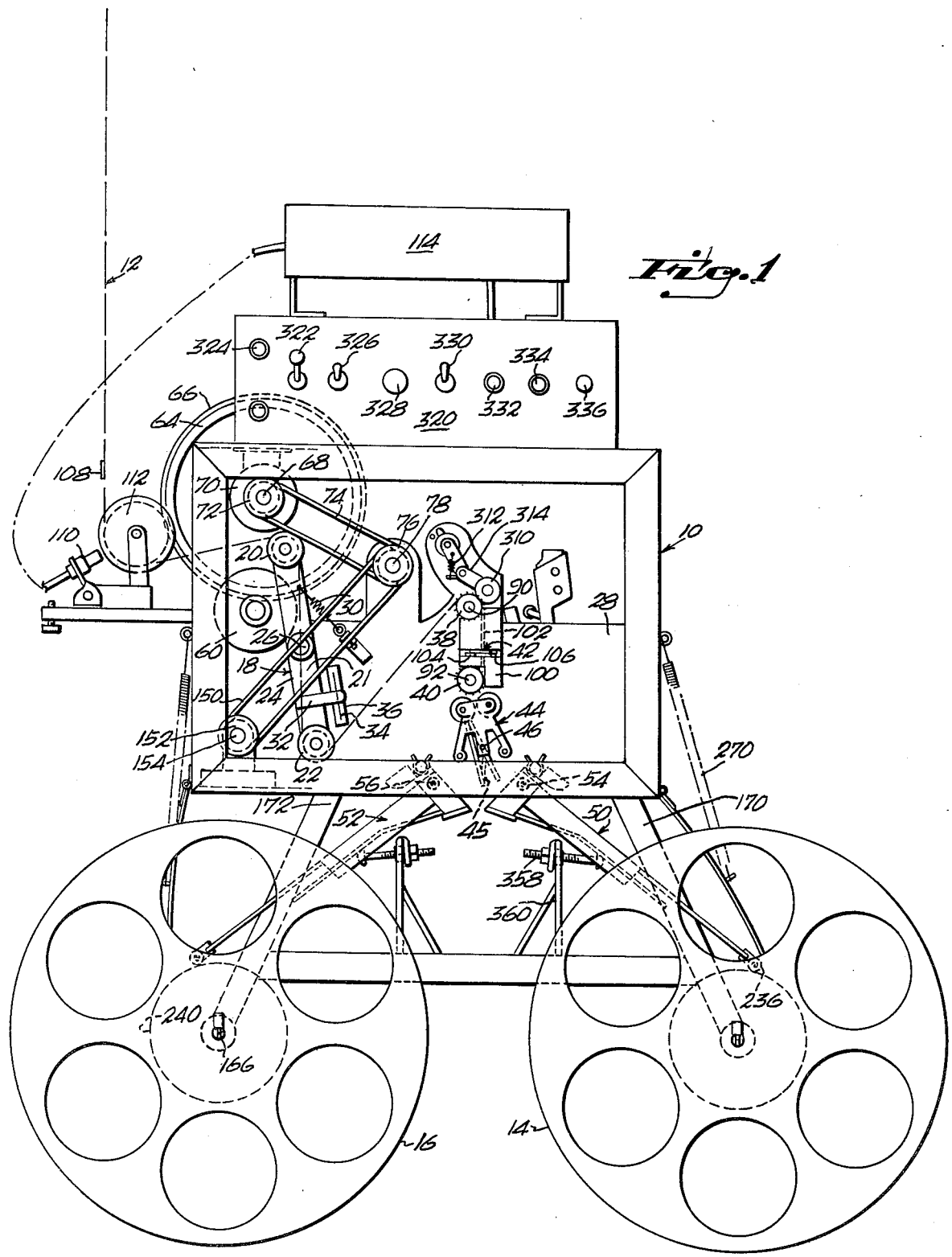
FIG. 1 is a front elevational view of the automatic film de-splicing and winding device of the present invention.
Figure 2:
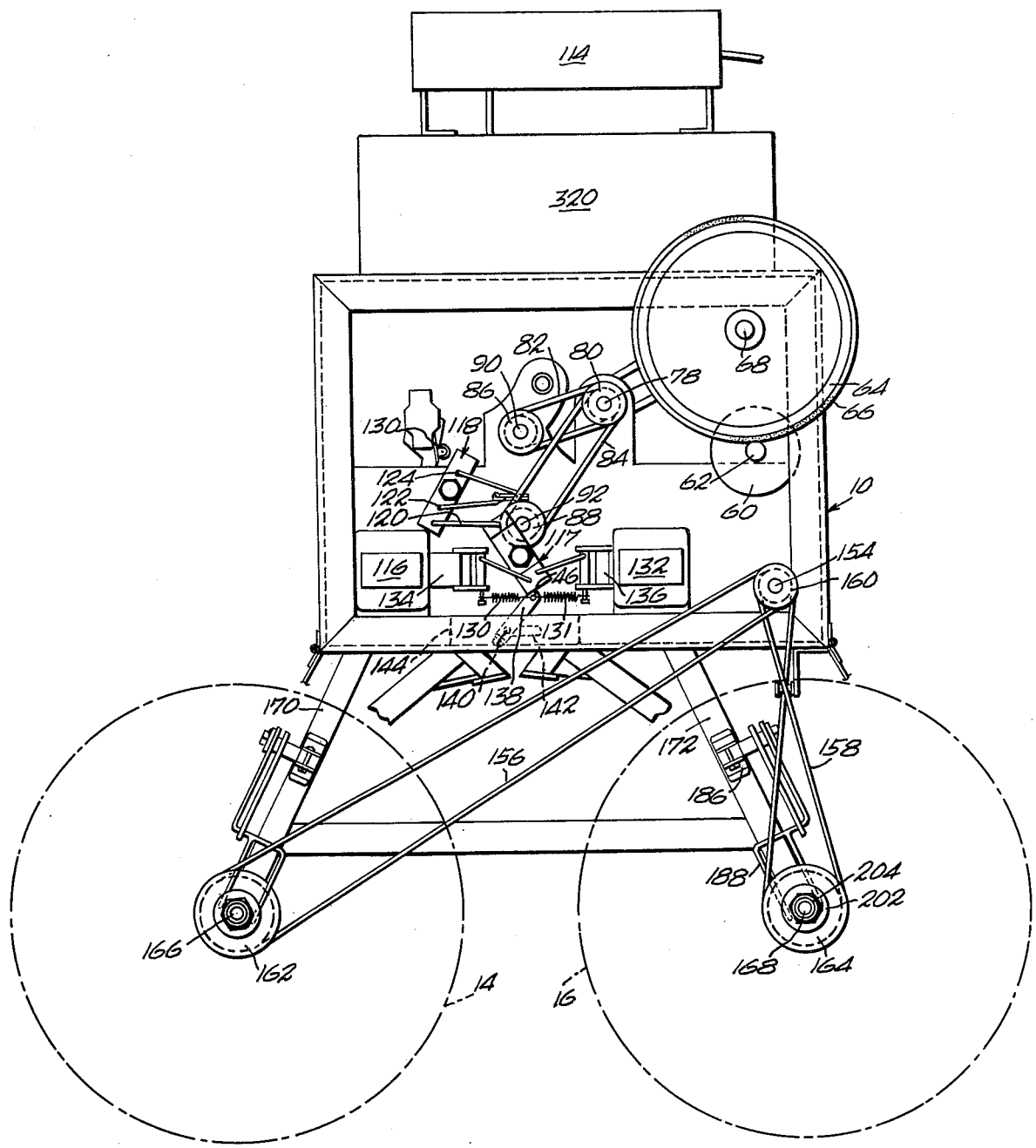
FIG. 2 is a back elevational view of FIG. 1.

With reference to the drawings and particularly to FIGS. 1 and 2, the numeral 10 generally indicates the frame which is conveniently supported on a wall at a predetermined height or in a vertically adjustable manner to accommodate the height of the user. As shown generally in FIGS. 1 and 3, a main length of film 12 is adapted to be fed through the device and severed into separate lengths, of 2,000 feet each, for example, with the lengths being sequentially wound on separate reels 14 and 16. It should be noted here that the only manual operation is the removal of a first reel such as 14 after it receives one entire cut length, and replace it with an empty reel.

Within the frame a film tension adjustment device 18 is provided which is composed of a pair of spaced apart film guide rollers 20 and 22 on opposite ends of a tension bar 21, centrally pivotally connected at 26 to a frame member 28. Bar 24 is biased by a spring means 30 to a predetermined attitude as determined by an indicator arm 32, fixed to bar 24 to normally align with a reference line 34 on a member 36, fixed to frame member 28.

Also carried by frame member 28, are a pair of spaced apart film feed sprockets 38 and 40. Between the sprockets 38 and 40 is a film cutter device, FIGS. 1 and 7, generally designated at 42, to be subsequently described in detail.

A swingable film guide mechanism, generally indicated at 44, in FIGS. 1 and 3, including flap means 45 provided to direct the severed film lengths 12 to one or the other of the shipping reels 14 and 16. Guide mechanism 44 is pivotally connected at 46 to frame member 28 for pivotal movement between the full line presentation in FIGS. 1 and 3 to direct the film strip 12 to the reel 14, and, the broken line position 44', FIG. 3 to direct the film strip to the reel 16. Guide tubes 50 and 52 pivotally connected at 54 and 56 to the frame 10 are provided to, for example, direct a first severed film length to reel 14, and a second length to reel 16. While reel 16 is being filled, reel 14 is replaced with another empty reel. When reel 16 is full with a second film length, a third film length is automatically directed onto the replacement reel for reel 14. This process continues until the entire length of spliced film, contained on the platter, is severed into its original segment lengths and wound onto individual shipping reels. Therefore, immediately after the final presentation of a film, the film is ready for shipment to its next destination in contrast to hours of manual labor conventionally required for this operation.

It should also be noted that, in practice, a series of guide rollers are strategically located in the projection room to guide the film from the platter to the device. This forms no part of the present invention and the guide rollers are located to accommodate the device in each individual projection room.

Drive means, including a motor 60, are provided to drive the various elements of the device. Motor shaft extension 62, FIG. 2, frictionally drives a large wheel 64, provided with a rubber tread 66 and a shaft 68, which is rotatably journalled in a carrier member 70, fixed to frame 10. Shaft 68 carries a main drive pulley 72, FIG. 1, connected by a belt 74 to a double-pulley 76 carried on a shaft 78 mounted through frame 28. Shaft 78, FIG. 2, carries a second double-pulley 80, on the back side, carrying two belts 82 and 84, respectively engaged on drive pulleys 86 and 88 carried on shafts 90 and 92 which carry the film drive sprockets 38 and 40.

Figure 7:
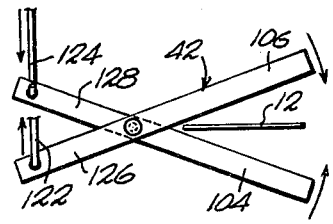
FIG. 7 is a detailed top plan view of the film cutter device of the invention.

The cutter 40 is pivotally carried in a housing 100, defining a film passage slot 102 extending downwardly from the upper film drive sprocket 38 to position the film length 12 between the centrally pivoted blades 104 and 106, FIG. 1, and particularly FIG. 7, of the cutter device 42 which is a scissors-type.

When the film strips segments are initially spliced, a small piece of metallic tape 108, FIG. 1, is adhered to the film strip a predetermined distance from each splice. A metal detector or sensor probe 110 is positioned adjacent to a final pulley 112 around which the film 12 passes before entering the device of the present invention. The sensor probe 110 sends a signal to a conventional, commercially available sensor, generally designated as 114, which actuates a solenoid 116, FIG. 2, to actuate a centrally pivoted lever arm 117, which in turn actuates a second centrally pivoted arm 118 by means of a link 120.

A pair of links 122 and 124, FIGS. 2 and 7, connect between opposite sides to the centrally pivoted arm 118 and respective rear blade ends 126 and 128 of the scissors cutter 42 to actuate same in opposite directions to actuate the blade portions 104 and 106 to cut the film 12. The second lever arm 118 contacts a limit switch 130 with each operation thereof to actuate a solenoid 132 to reverse the movement of the links 122 and 124 to return the scissors cutter 42 to its normal open position.

A pair of tension springs 130 and 131 are fixed at opposed outer ends to the armatures 134 and 136 of the solenoids 116 and 132, and at confronting inner ends to a top end of a sliding pivot arm 138, the bottom pivot pin 140 thereof being slidable in a slot 142 in a frame member 144. The pivot pin 46 of guide mechanism 44, FIGS. 1 and 2, is fixed in the top end of sliding pivot arm 138 and when the solenoids 116 and 132 are operated, the sliding pivot arm 138 passes over the center of pivot pin 140 causing sliding movement of pivot pin 140 to the right in slot 142, thereby angling the guide mechanism 44 to direct the next film length away from guide tube 50 and toward guide tube 52, as illustrated in broken lines in FIG. 3. The angles assumed by the sliding pivot arm 138, the length of the slot 142 and the forces of springs 130 and 131 are designed to alternate the angle of the guide mechanism after each operation of the scissors cutter 42.

A belt 150, FIG. 1, connects between the double-pulley 76 and a pulley 152 carried on a shaft 154, and as seen in FIG. 2, a pair of belts 156 and 158 connect between a double-pulley 160 on the back side of shaft 154 and engage about respective pulleys 162 and 164 carried on shafts 166 and 168 carried on lower ends of a pair of oppositely, outwardly downwardly angled arms 170 and 172 fixed to the bottom frame 10. Shafts 166 and 168 carry the respective reels 14 and 16 and as both structures are alike, the following description refers to the pulley 162 on shaft 166 as seen in FIGS. 2 and 5.

Pulley 162 is normally loosely journalled on shaft 166 and a disc member 180 is fixed as by pin 182 to the shaft 166 with a clutch disc 148 interposed between disc 180 and pulley 162 to define a slip clutch device. A solenoid 186 is carried on arm 170 and a clutch yoke 188, having an upper end engaged on the solenoid armature 190, is centrally pivoted at 192 between a pair of arms 194. Roller means 196 carried on the bottom end of yoke 188 engage a shoulder portion 198 of pulley 162. The shaft 160 projects rearwardly of the pulley shoulder portion 198 and carries a compression spring 200 thereon, engaged between the shoulder portion 198 and a washer 202, adjustably retained in place by nut means 204 engaged on a threaded outer end 205 of shaft 160. The clutch is normally engaged to turn the reel to convolutely wind a film length thereon, however, the solenoids on the two arms 170 and 172 are electrically operated in a conventional manner in unison with the above-described film cutting operation and shifting of the angular guide mechanism 44 to selectively disengage the drive to the shaft 166 or 168 carrying the reel 14 or 16, not engaged in the current film winding operation. A conventional quick release lock means 210 holds the reels 14 and 16 in place on the shafts 166.

With particular reference to FIG. 4, each of the film guide tubes such as 50 defines a generally rectangular tubular configuration in cross section with an enlarged flared mouth portion 220 opening into a reduced size main length portion 222. A cross rod 224 is fixed by welding to a top end portion 226, secured to the side walls of the mouth portion. Rod 224 is pivotally engaged through bottom frame members 228 of the main frame 10 and secured in place by clips 230.

Side walls 232 are cut out as at 234 in the lower portion of the main length portion 222 and a roller 236 is journalled on the lower distal end 238 thereof to bear against a length of film 12 as it is being wound onto the hub 240 of a reel such as 14.

To obviate the problem of initiating the winding of the leading end portion of a film strip on the hub 24, a film retainer assembly generally indicated at 242 is provided which is formed of a plurality of relatively thin, narrow spring metal segments. A main length 244 of assembly 242 is hinged at an upper end as at 246 to the frame 10 at a lower end thereof in alignment with the open peripheral edge of the reel 14. A first arcuate member 248 is hinged at 250 to the lower end of 244 and a similar, second arcuate member 252 is hinged at 254 to first arcuate member 248. Arcuate member 252 terminates just short of the underside of the film strip 12 as it passes under the roller 236. An appropriately configurated generally upwardly angled spring strip 256 is hinged at 258 to the distal end of arcuate member 252 and terminates in a latch portion 260 which is adapted to engage in a shallow recess 262 in a projection 264 carried by a bottom wall 266 of the main length portion 222.

A portion 268 of the spring strip 256 may be configurated to form a portion of the bottom wall of the film guide 50 and a tension spring 270 connects between the frame 10 and the main length 244 of assembly 242.

A lead-in guide roller 272 for the film strip 12 is disposed in the mouth portion 220 and the roller 236 as above-stated guides the film strip 12 onto the reel hub 240. The engagement of latch 260 in recess 262 is appropriately balanced so that a predetermined number of film convolutions about hub 240, two or three, for example, will disengage the latch 260 from the recess 262 whereby the entire assembly 242, by means of spring 270, will disengage the film winding and snap outwardly as indicated by the broken line illustration 242'.

FIG. 6 illustrates a tensioning means for the double-pulleys 76 and 80, FIGS. 1 and 2, whereby a proper amount of tension may be applied to the film strip 12 as it passes about feed sprockets 38 and 40. To this end, a compression spring 300 is disposed about an extension 302 of shaft 78 and is engaged between pulley 80 and a washer means 304, adjustably held in place on a screw threaded end portion 306 of extension 302 by nut means 307. Pulley 80 is bisected by a clutch pad 308 and the pulley portion 80' only, is keyed to shaft 78.

A further tensioning means, FIG. 1, comprises a roller 310 which is spring loaded at 312 and pivotably linked at 314 against the film strip 12 as it passes over and around the sprockets 38.

A generally conventional control box 320 is provided including a power "on" switch 322 and an indicator "on" light 324. A three position switch 326 provides "off", "automatic" and "manual" positions, a speed control rheostat 328 and a panel light switch 330. The device preferably includes a generally conventional protection circuit including a green light 332, a red light 334 and a reset button 336.

In operation, the film web 12 is extended from the platter around pulley 112 and the spring loaded tensioning pulleys 20 and 22 upwardly and around the driven feed sprocket 38, downwardly through slot 102 for engagement by the cutter means 42 which reacts to the sensor probe 110 when a piece of metallic tape 108, fixed to the film web 12, passes thereby to actuate the cutter 42 by means of the conventional sensor means 114. The film strip 12 is first wound on one reel 14, for example, and after the cutting operation, the leading end of the next film strip is directed onto the reel 16 by means of the swingable film guide mechanism 44, as above-described. Additionally, guide rollers 350 352, 354 and 356 are carried by the swingable film guide mechanism 44 and set screw means 358, FIG. 1, mounted on a bracket 360 is provided to adjust the position of roller 236 on each guide finger 50 and 52 to determine the number of film convolutions to be disposed on the reels 14 and 16 before the automatic release of the film retainer assembly 242.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. Apparatus for severing separate lengths from a main continuous length of film which is marked with adhesive metallic tape at the spliced points and sequentially winding the separate lengths on spearate reels, including, a main frame, a main drive means, a pair of reels removably suspended beneath the frame in a spaced coplanar relation, film guide track means for each reel, pivotally attached at an upper end to the frame and including an angularly extended lower end, normally in contact with a hub of the reel between side plates thereof; means to guide the main film length into the apparatus, means to tension the main film length, sprocket means engaged with an existing sprocket hole track in the length of film to drive the length of film through the apparatus, means to drive said sprocket means from said main drive means, cutter means to sever the film, means to sense each piece of metallic tape and to operate said cutter means in direct response thereto to sever the film, and means to selectively guide the film onto a hub portion of one of the pair of reels and to redirect the next separate length onto the other of said pair of reels.

2. The apparatus as defined in claim 1 wherein said means to sense comprises a conventional metal sensor probe which reacts to each piece of metallic tape to operate a conventional sensor device to energize solenoid means to, in turn, actuate said cutter means to cut the film.

3. The apparatus as defined in claim 2 wherein said cutter means is of a scissors type.

4. The apparatus as defined in claim 3 including interconnected pivotal lever and link means connecting between a pair of solenoids, comprising said solenoid means, and first ends of said scissors means to actuate second cutter ends of the scissors cutter to sever a strip of film passing therebetween.

5. The apparatus as defined in claim 1 wherein said means to guide and redirect includes a first guide pulley to receive the continuous length from a conventional platter of a movie projector system.

6. The apparatus as defined in claim 1 wherein said means to tension comprises a centrally pivoted, spring loaded lever including a guide roller rotatably attached to each end thereof for passage therearound of the continuous length from said first guide pulley.

7. The apparatus as defined in claim 6 wherein said sprocket means includes a first sprocket operably driven by said main drive means.

8. The apparatus as defined in claim 7 wherein said sprocket means includes a second sprocket, operably driven by said main drive means and being disposed in a spaced apart relation to said first sprocket, with said cutter means being positioned between said first and second sprockets.

9. The apparatus as defined in claim 1 wherein said main drive means includes an electric motor.

10. The apparatus as defined in claim 4 wherein said means to selectively guide and redirect includes a flap means operably connected between said pair of solenoids in a manner whereby said flap means is alternately angularly adjusted to alternately direct a length of film onto, first, one reel of said pair, and then the other reel.

11. The apparatus as defined in claim 10 wherein each of said film guide track means comprises a guide member defining a passageway including a flared upper entrance mouth, positioned to receive a film length from said flap means in one of said flap angularly adjusted positions.

12. The apparatus as defined in claim 11 including a solenoid operated slip clutch means operably connected to said main drive means for operation in unison with said film cutting and flap means to selectively drive each one of said pair of reels as it receives a length of film thereon.

13. The apparatus as defined in claim 12 including automatically releasable means to loosely engage about a substantial portion of each reel hub to receive a leading end portion of a length of film between the hub and releasable means and to secure the leading end portion in place about said hub until a predetermined number of convolutions of said leading end portion, two or three convolutions, for example, are in place, and including means to release said releasable means after said convolutions are secured in place.

14. The apparatus as defined in claim 13 wherein said releasable means comprises a hinged together segmented spring metal band assembly including a first segment hinged to said frame, a plurality of intermediate arcuate segments extending around a major portion of the reel hub and a distal end segment including an end latch for engagement in a shallow recess, whereby said latch is automatically released when said predetermined number of convolutions are in place and said segmented assembly is moved free of the hub area under the influence of a tension spring connected between said frame and first segment.

15. The apparatus as defined in claim 11 including a film guide roller spanning said flared entrance mouth.

16. The apparatus as defined in claim 10 including a plurality of film guide rollers carried by said means to selectively guide and redirect to guide a length of film in its travel to both of said reels.

17. The apparatus as defined in claim 11 including set screw adjustment means to selectively raise or lower each of said film guide track means relative to a hub portion of a reel.

18. The apparatus as defined in claim 9 wherein said main drive means includes an adjustable spring loaded slip clutch.

* * * * *